United States Patent [19]

Norman

[11] 3,772,660

[45] Nov. 13, 1973

[54] SOLID STATE SWITCHING AND MEMORY APPARATUS

[75] Inventor: Robert H. Norman, Redwood City, Calif.

[73] Assignee: Fairchild Camera and Instrument Corp., Syosset, N.Y.

[22] Filed: July 2, 1969

[21] Appl. No.: 838,574

Related U.S. Application Data

[62] Division of Ser. No. 263,049, March 5, 1963, Pat. No. 3,562,721.

[52] U.S. Cl. .............................. 340/174 R, 307/238

[51] Int. Cl. .......................... G11c 11/40, G11c 5/02

[58] Field of Search ...................... 340/173; 307/238, 307/279

[56] References Cited

UNITED STATES PATENTS 3,218,613 11/1965 Gribble et al. .................. 340/173 R

*Primary Examiner*—Stanley M. Urynowicz, Jr.
*Attorney*—Roger S. Borovoy and Alan H. MacPherson

[57] ABSTRACT

A memory cell having two transistors, each transistor having two emitters, a base, and a collector; the bases and the collectors of the transistors are cross-coupled; by the application of a first signal to one of the emitters of each of the two transistors simultaneously, and a second signal at the same time to the other emitter of only one of the two transistors, the transistor having the second signal at its emitter is placed in a conducting state so that data is stored in the cell having the actuated emitter.

2 Claims, 13 Drawing Figures

*INVENTOR.*
ROBERT H. NORMAN

ATTORNEYS

INVENTOR.
ROBERT H. NORMAN

Roger S. Borovoy
ATTORNEYS

INVENTOR.
ROBERT H. NORMAN

Roger S. Borovoy
ATTORNEYS

SOLID STATE SWITCHING AND MEMORY APPARATUS

This application is a Divisional application of Application Ser. No. 263,049 entitled "SOLID STATE SWITCHING AND MEMORY APPARATUS," filed Mar. 5, 1963 now U.S. Pat. No. 3,562,721 by the same inventor. This invention relates to a semiconductor switching circuit and memory apparatus. More specifically, the invention is a switching circuit which requires two independent pulses to change state, and a high-speed data storage system using this switching circuit.

Conventionally, computers have magnetic core memories. These have numerous disadvantages. First, writing into and reading out of them is too slow to permit their operation at a bit rate as high as is presently required—i.e., about 10 megacycles. Second, they often are incompatible with the logic circuitry in the rest of the computer. For example, the high current pulses required for data storage in the memory pose circuit problems and are a source of noise within the rest of the data processing system. Magnetic core memories may not be operated over a wide ambient temperature range. Furthermore, they require large and complex apparatus, having a high power consumption.

It has therefore been proposed to use conventional logic circuitry as a memory. This approach achieves high read-write speeds, and provides a system which is compatible with the other logic circuitry. However, using presently available components and circuits, such a system is still large and complex.

This invention provides a new switching circuit, particularly designed for a logic memory circuit, which achieves a substantial reduction in the number of components required. Briefly, the switching circuit of this invention uses two pairs of parallel-connected transistors. The bases and the collectors of the transistors of each pair are connected. The common bases of each pair of transistors are connected to the common collectors of the other pair. One transistor of each pair is biased, usually by a voltage between the common collectors and one of the emitters of each pair of transistors, so that one transistor of one pair is ON while the corresponding transistor of the other pair is OFF. An ON condition is one where the transistor is substantially conducting between collector and emitter; OFF, on the other hand, is a condition where the transistor is substantially non-conducting between its collector and emitter. The state of the circuit is switched by a pulse transmitted to the emitter of one of the transistors of a pair having one of its transistors OFF. A pulse to a pair which is ON does not cause a change in circuit state.

When the switching circuit described above is used in a memory system, the emitters of one transistor of each pair are connected. In order to cause the transistors to change state, not only is a pulse sent to one of the non-connected (or free) emitters of the pair of transistors having the one which is OFF, but also a pulse is transmitted to the connected emitters. It is only when these two pulses coincide that the state of the transistors can be switched. This second pulse to the connected emitters is used as a control pulse. When many of the switching circuits described above are connected together in a matrix to make up a memory system, the one circuit desired to be written into is selected by proper application of both pulses. The two pulses together serve two purposes: (1) they select the desired switching circuit to be written into, and (2) they determine its desired final state (SET OR RESET). If it was already in that state, no change occurs; if not, it is switched.

The control pulse is also used for reading from the memory circuit. Each column of switching circuits has an associated differential amplifier used for reading. However, since there may be many switching circuits in a column, the control pulse determines the switch in the column to be read by the reading mechanism. The actual detailed methods of reading and writing into the memory system using switching circuits of this invention will be explained later.

The invention may be more clearly understood from the following more detailed description, referring to the drawings in which:

FIGS. 1 A–B are identical schematic circuit diagrams of a switching circuit of one embodiment of this invention showing representative voltage values in each switching position;

FIGS. 2 A–F are identical schematic circuit diagrams of a switching circuit of another embodiment of this invention showing representative voltage values under various conditions;

Figure 1A:
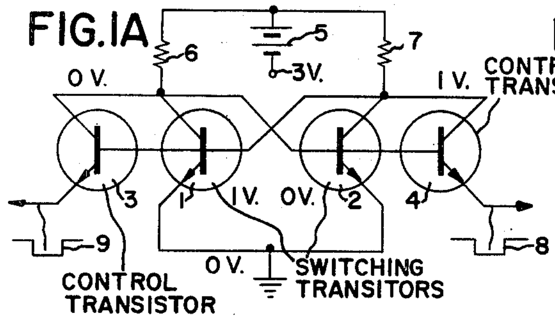

FIG. 1 shows a four transistor switching circuit of the invention. The transistors shown are NPN; with proper changes in voltage p0larities, PNP transistors would work equally well. Transistors 1 and 2 are the switching transistors, and transistors 3 and 4 are the control transistors. Transistors 1 and 3 form one pair of transistors, (hereinafter called the "odd pair"), including a switching transistor and a control transistor, and transistors 2 and 4 form another pair of transistors (hereinafter called the "even pair"). The collectors and the bases of each pair of transistors are connected, and the collectors of the odd pair are connected to the bases of the even pair, and vice-versa. The switching transistors are biased by application of a bias voltage between their collectors and their emitters. This bias voltage is shown as battery 5 connected to the collectors of transistors 1 and 2 through resistors 6 and 7, respectively. In this embodiment, the emitters of the switching transistors are connected to ground. However, this voltage need not necessarily be ground as it is selected in relation to the magnitude and polarity of battery 5 to provide the correct biasing of the switching transistors.

The transistor biasing is such that one of the switching transistors is always ON (conducting between its collector and emitter) while the other is OFF (non-conducting between its collector and emitter). This can be most easily explained by selecting some representative values of voltage. These are shown in FIG. 1 A. The battery voltage is +3 volts. Assume that transistor 1 is conducting (ON) and that transistor 2 is then OFF. The collector voltage of the odd pair (having the ON transistor) is 0 volts, and of the even pair (having the OFF transistor) is 1 volt. Since the collectors of the even pair are connected to the base of transistor 1, the bases of the odd pair, these bases are also at 1 volt, as shown. The emitters of the switching transistors are at 0 volts. This places a positive base-emitter voltage of 1 volt on transistor 1. Such a positive base-emitter voltage keeps transistor 1 ON. On the other hand, the collectors of the odd pair are connected to the bases of the even pair. The base of transistor 2 is thus at 0 volts. This puts the base-emitter voltage of transistor 2 at 0 volts and keeps that transistor substantially OFF.

When there are no WRITE pulses applied, the emitters of control transistors 3 and 4 are effectively open circuits. Since there is substantially no emitter current, their emitter voltages tend to follow their base voltages. The base voltage of control transistor 3 is 1 volt and the base voltage of transistor 4 is 0 volts.

Figure 1B:
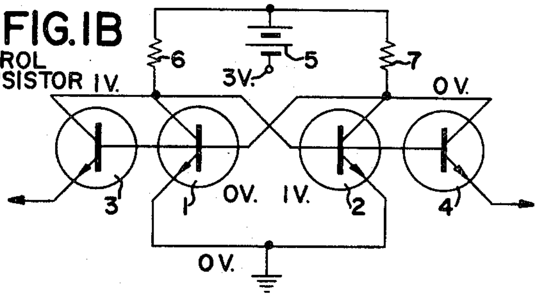

Now, however, consider that there is applied to the emitter of control transistor 4 a negative WRITE pulse 8 of sufficient magnitude to reduce its emitter voltage appreciably below the base voltage. This turns the transistor ON and brings the collector voltage (and that of switching transistor 2) to 0 volts. The base voltage of transistor 1 is also reduced to 0 volts and that transistor is thus turned OFF because there is no longer a positive base-emitter voltage. The collector voltage of transistor 1 then rises to 1 volt, raising the base voltage of switching transistor 2 to 1 volt, and turning that transistor ON. A complete reversal has occurred and the new state is shown in FIG. 1B. Transistor 2 which was previously OFF has been turned ON and transistor 1 which was previously ON has been turned OFF. If this WRITE pulse, however, (shown as pulse 9) were sent to control transistor 3 (which controls an ON transistor) instead of the control transistor 2 (which controls an OFF transistor), it would have had absolutely no effect. The collectors of the odd pair were already at 0 volts and switching transistor 1 was ON so that the negative pulse has no effect. A WRITE pulse therefore, which is sent to the switching circuit to place the circuit in the same state (SET or RESET) that it was already in, has no effect.

The circuit shown in FIGS. 2A–F is the same as in FIG. 1 (and the same numbering used) except that instead of the emitters of the switching transistors being connected to ground, they are connected to a grounded control pulse source 10. With NPN transistors connected as shown in FIG. 2, the control pulse is a positive one, for example, 1 volt. The WRITE pulses 8 and 9 are then negative pulses, for example, of sufficient value to reduce the emitter voltage on the appropriate control transistor to 0 volts.

Figure 2A:
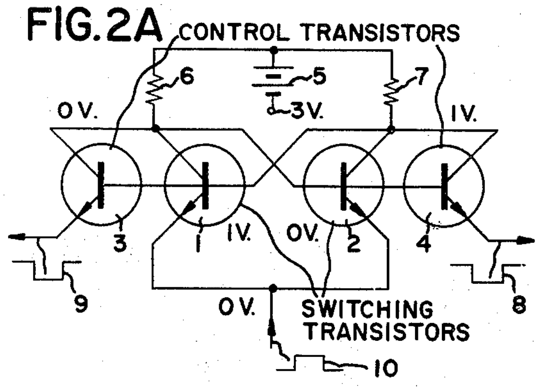

Examining the operation of the circuit shown in FIG. 2A using the same voltages as before, transistor 2 is OFF and has a collector voltage of 1 volt. Transistor 1 in ON and has a collector voltage of 0 volts. The emitters of the switching transistors 1 and 2 are again at 0 volts when there is no pulse from pulse source 10. With no WRITE pulses from the write pulse sources 8 and 9, the emitters of the control transistors 3 and 4 are again open circuited.

Suppose now that a WRITE pulse is sent from write pulse source 8 into the emitter of control transistor 4 sufficient only to bring that emitter to 0 volts, or ground, but no control pulse is applied to the emitters of the switching transistors. The base voltage of transistor 4 is 0 volts so there is still no positive base-emitter voltage in transistor 4 sufficient to cause base-emitter current to flow and turn the transistor ON. Therefore, in this case, no switching can take place.

Figure 2B:
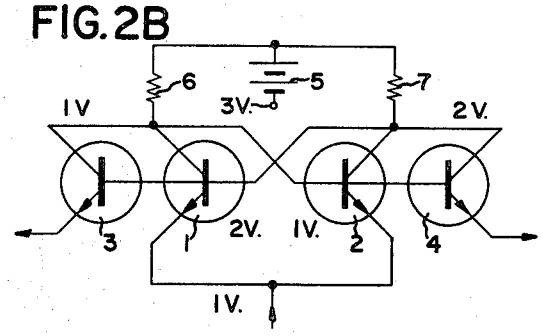
Figure 2C:
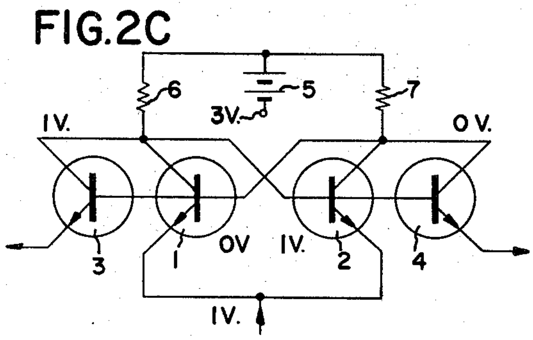
Figure 2D:
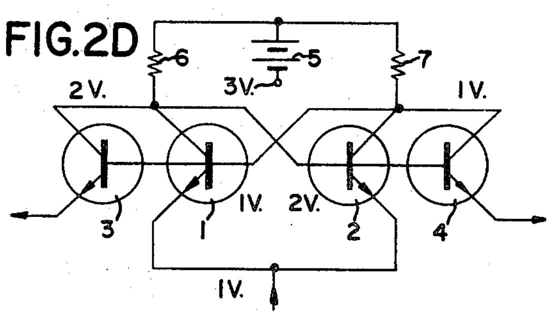
Figure 2E:
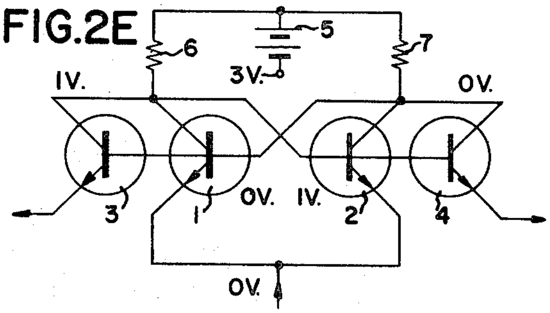

Now assume that a control pulse 10 of 1 volt is applied to the emitters of transistors 1 and 2 along with the WRITE pulse to the emitter of transistor 4. The effect of the control pulse is shown in FIG. 2B. The collector voltage of the odd pair (having its switching transistor ON) and therefore the base voltages of the even pair are raised from 0 volts to 1 volt. Correspondingly, the collector voltage of the even pair (having its switching transistor OFF) and therefore the base voltage of the odd pair is raised from 1 volt to 2 volts. When a WRITE pulse is applied to the emitter of transistor 4 which brings the emitter voltage of transistor 4 to 0 volts, the result is shown in FIG. 2C. The base of transistor 4 (connected to the collector of transistor 1) remains at 1 volt. There is then a + 1 volt base-emitter voltage on this transistor and base-emitter current now flows in transistor 4, turning it ON. When transistor 4 is turned ON, its collector voltage becomes the same as its emitter voltage (0 volts). The collector of transistor 2 is then also at 0 volts (rather than 2 volts as before) and so is the base of transistor 1. Since the emitter of transistor 1 is at 1 volt, base-emitter current can no longer flow through it, and it is turned OFF. When this occurs, the circuit is shown in FIG. 2D. Its collector voltage is then raised to 2 volts, as is the base voltage of transistor 2. The emitter of transistor 2 is still at 1 volt so that base-emitter current which now flows through transistor 2 turns that transistor ON. The state of the circuit has thus been switched. When the pulses are removed, the circuit is shown in FIG. 2E. The collectors of the even pair return to 0 volts and the collectors of the odd pair return to 1 volt.

This switching could not have occurred but for the application of control pulse 10 to the emitters of transistors 1 and 2 concurrent with the application of a write pulse 8 to the emitter of control transistor 4 of the pair having an OFF switching transistor. Again, in this embodiment, no change in state would occur if a write pulse 9 were sent to the control transistor controlling an ON switching transistor even if there were a simultaneous control pulse. Furthermore, a control pulse without a write pulse would merely raise the emitter and collector voltages of the switching transistors 2 and 4 from the values shown in FIG. 2A to those shown in FIG. 2F, but no switching would occur.

Summarizing the operation of the circuit of FIG. 2, assume that when the switching transistor 2 of the even pair is ON that the state of the circuit is SET and that when the switching transistor 1 of the odd pair is ON that the state of the circuit is RESET. When the circuit is SET, a control pulse plus a WRITE pulse to the emitter of control transistor 3 of the odd pair are required to switch it; when the circuit is RESET, a control pulse plus a WRITE pulse to the emitter of control transistor 4 of the even pair are required to switch it.

It is also possible to apply separate control pulses to the emitters of the switching transistors. This permits separate control of each switching transistor and makes possible operation of the switching circuit in reverse. The former WRITE pulses can then be used as control pulses and vice versa.

Figure 2F:
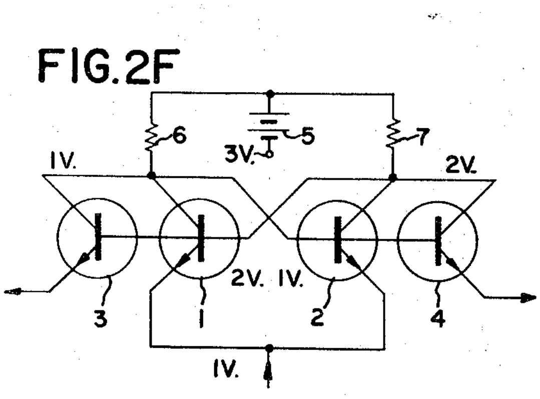
Figure 3:
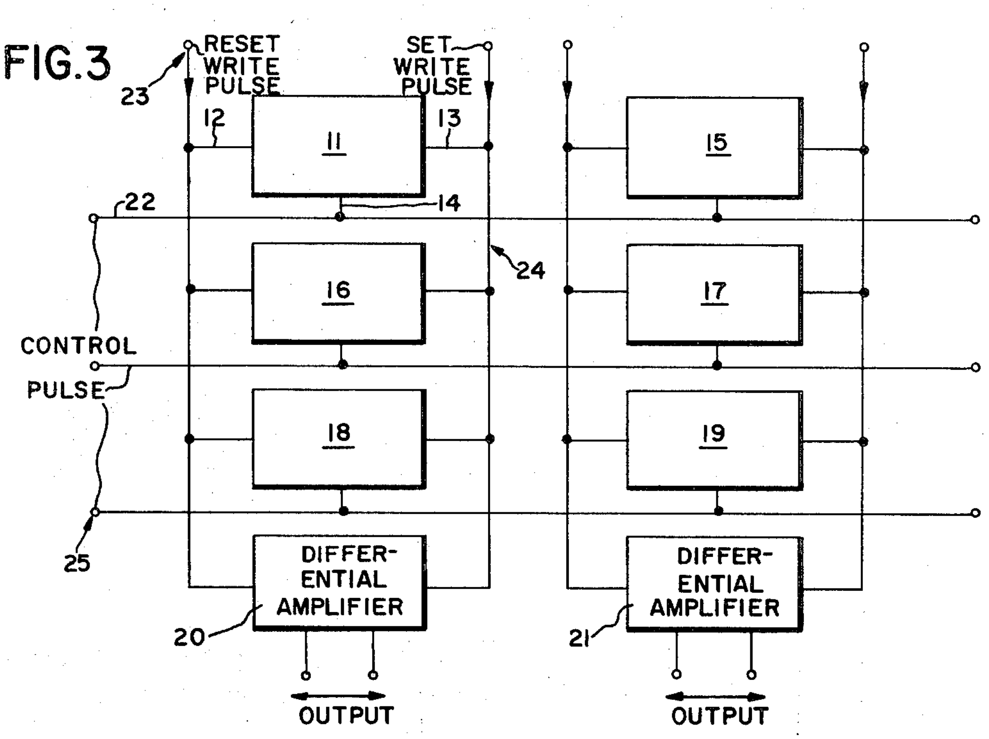
FIG. 3 is a block diagram of a memory apparatus using a plurality of switching circuits shown in FIG. 2, showing the read-out apparatus.

A block diagram of one memory system comprising a matrix of switching circuits like the ones shown in FIG. 2 is illustrated in FIG. 3. One switching circuit 11 has leads 12 and 13 to the emitters of each of the two control transistors. Lead 14 is attached to the common emitters of the switching transistors. The remaining switching circuits 15–19 are connected in the same way, as shown. Differential amplifiers 20 and 21 are for the purpose of reading the contents of one of the switching circuits in the column in which such amplifier is connected. Amplifier 20 reads the contents of one of switching circuits 11, 16, or 18; amplifier 21 reads the contents of one of switching circuits 15, 17, or 19. Because of the unique properties of the switching circuits of the invention to be explained more fully later, the amplifier reads the contents of only that switching circuit in its column which is signaled with a control pulse in the same manner as when writing.

The method of storing date (writing) into an individual circuit was described in detail above. The matrix of FIG. 3 operates as follows: A control pulse of a certain duration is sent into the row of switching circuits including the specific circuit to be written into. For example, to write into circuit 11, a control pulse is sent into line 22, and a WRITE pulse is sent to the proper emitter of a control transistor of that circuit through lines 23 or 24. For SET, the WRITE pulse is sent into line 24; for RESET, it is sent to line 23. The control pulse and the WRITE pulse combine to switch the state of the circuit, provided it was not already in the state to which the WRITE pulse corresponds. The control pulses are also transmitted to the emitters of the switching transistors of the other switching circuits in the same row as circuit 11. However, the collector voltages of the transistors in these circuits are merely raised, as discussed above, with no effect on the switching transistors because there was no WRITE pulse.

The reading operation is the opposite of the writing operation. However, the desired switching circuit to be read is selected from all the circuits in a particular column having the same read amplifier by means of the same control pulse used to write into the circuit. When circuit 11, for example, is to be read, a control pulse is sent through line 22. The reading operation is best understood by referring back to FIG. 2A. Using the same values as before, with no WRITE pulses applied, the emitters of the control transistors are open circuits and their voltages tend to follow their base voltages. Again using illustrative values (which do not necessarily correspond to preceding values), the base voltage of transistor 3 is 1 volt and the base voltage of transistor 4 is 0 volts. With no control pulse applied, the emitters of transistors 1 and 2 will assume some arbitrary voltage, depending on the state of other switching circuits on the same line. Transistor 1, as before, is ON so that its collector voltage is 0 volts; transistor 2 is OFF and its collector voltage is 1 volt.

When a control pulse is applied to the emitters of switching transistors 1 and 2 (with no WRITE pulses) the OFF transistor 2 remains OFF and the ON transistor 1 remains ON. The collector voltage of transistor 1 which is the base voltage of transistor 4 is raised from 0 to 1 volt. The collector voltage of transistor 2 which is the base voltage of transistor 3 is raised from 1 volt to 2 volts. This state is shown in FIG. 2F. Since the emitters of the control transistors 3 and 4 are essentially open, their voltages will tend to follow their bases. The emitter of transistor 3 is therefore at 2 volts and the emitter of transistor 4 at 1 volt. The emitter voltage of transistor 3 sets the voltage on line 23 (FIG. 3) at 2 volts. The emitter voltage of transistor 4 sets the voltage on line 24 (FIG. 3) at 1 volt. Therefore, if this switching circuit 11 were the only one in the column having amplifier 20, the voltage difference seen by that amplifier would be 1 volt, indicating that switching circuit 11 was RESET. In the reverse case, the voltage seen would be a −1 volt, indicating SET.

The other switching circuits on the same lines (23 and 24) as amplifier 20 have no effect upon its measurement. None of these other switching circuits receive a control pulse. The emitter voltages of the control transistors in all the other switching circuits in the column are maintained equal to or in excess of their base voltages. The control transistors in signaled circuit 11 (FIG. 3) put at least 1 volt on the lines. Hence, the control transistors in the rest of the column are back-biased and can contribute nothing to the voltage difference between lines 23 and 24. Only the circuit receiving a control pulse (in this case, circuit 11) contributed to the 1 volt voltage difference seen by the amplifier 20.

In the same manner, if the circuit 18 is to be read, a control pulse is sent through line 25 and the state of the circuit read at amplifier 20. A control pulse is also sent through line 25 to read circuit 19, however that circuit is read at amplifier 21 rather than amplifier 20.

Figure 4:
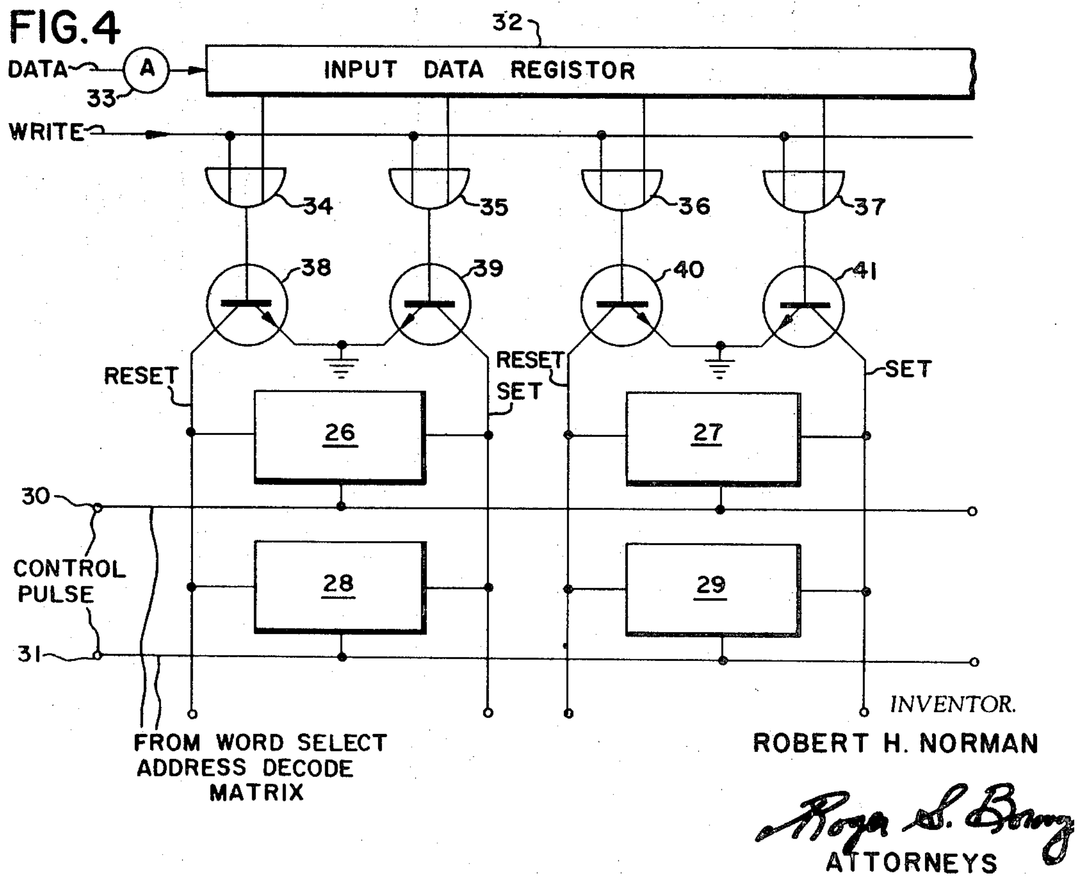
FIG. 4 is a schematic block and circuit diagram of a memory apparatus using a plurality of switching circuits shown in FIG. 2, showing the read-in apparatus.

The use of the memory circuit of this invention in a data storage system is shown in FIG. 4. The matrix of switching circuits 26, 27, 28, and 29 are those described above. Control pulses are sent to the control lines 30 and 31 from a conventional word select address decode matrix, of the type well known in the art. Data is stored in a conventional input data register 32 from the data source. The input of data into the register is regulated by an AND gate 33 in a manner old in the art. Storage of the data in the memory is effected by the combination of WRITE pulses and control pulses, as explained earlier in this specification. When there is no WRITE pulse, NOR gates 34, 35, 36 and 37 will have no output because one input will be positive (a NOR gate only has an output when both inputs are negative). In this state, the transistors 38, 39, 40 and 41 are non-conducting (OFF) and the voltage of the SET and RESET lines depend entirely upon the switching circuits in the respective columns. When a WRITE pulse is sent, all of the NOR gates having a 0 stored in their respective portion of the input data register 32 will have an output. Those having an output will turn on one or more of the transistors 38–41 associated with them, thereby grounding the SET or RESET line connected to the collector of that transistor. Of course, a reference voltage other than ground could be used. This change in the collector voltage of transistors 38–41 provides the negative WRITE pulse to the emitters of the control transistors in switching circuits 26–29.

Concurrently with the WRITE pulses are sent into the proper controls lines 30 and 31. The combination of a WRITE pulse and a control pulse governs the setting of the memory. For example, a WRITE pulse to NOR-gate 34 along with a control pulse to line 30 will cause switching circuit 26 to be RESET; a WRITE pulse to NOR-gate 35 and a control pulse to line 30 will cause circuit 26 to be SET. If the desired circuit were not previously in the desired setting, it would be switched by the combination of the two pulses as explained above.

Figure 5:
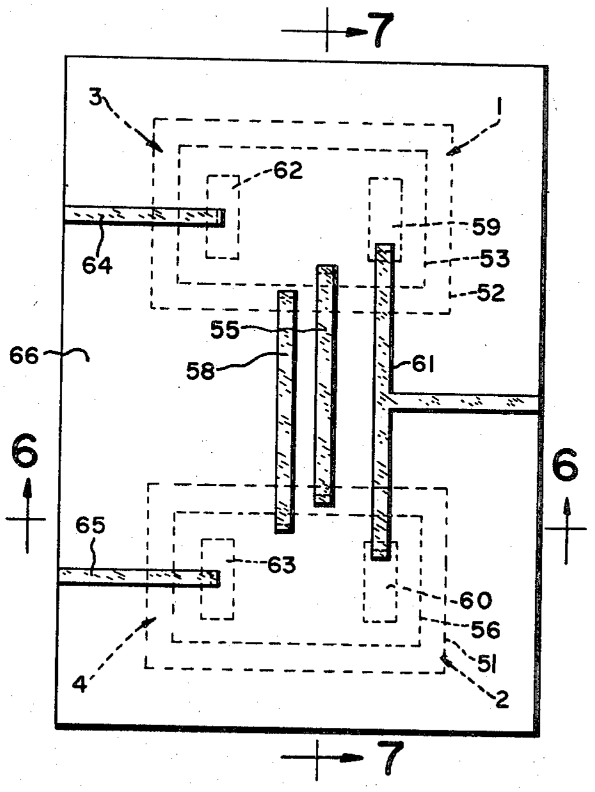
FIG. 5 is a somewhat schematic, greatly magnified plan view showing a switching circuit in a wafer of semiconductor material.
Figure 7:
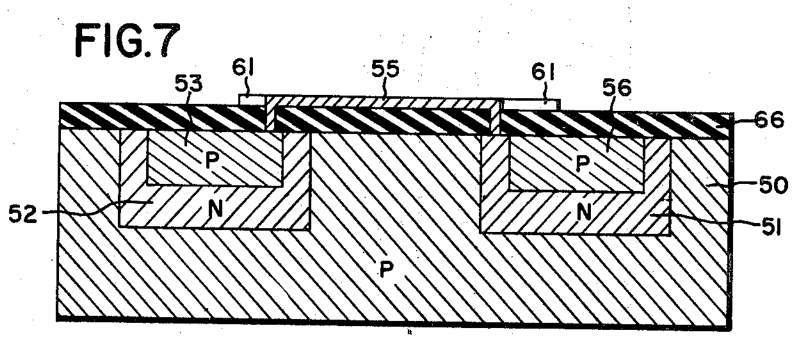
FIG. 7 is a transverse section taken along line 7—7 of FIG. 5.
Figure 6:
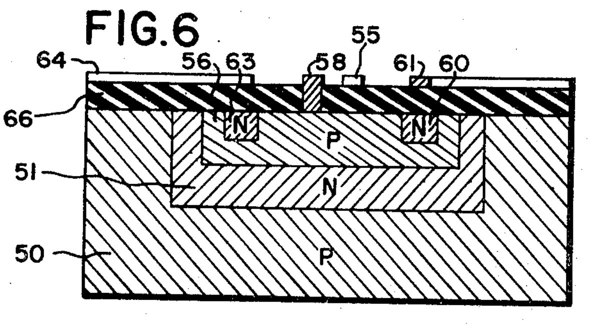
FIG. 6 is a transverse section taken along line 6—6 of FIG. 5.

FIGS. 5, 6, and 7 show how a switching circuit of this invention is fabricated in one wafer of semiconductor material. Referring to FIGS. 5, 6, and 7, a single wafer of P-type semiconductor material 50 is used as the substrate. In the illustration, four transistors are shown (one switching circuit of the invention). The numbers given the four transistors in FIG. 2 are used again here. The even pair have common collectors 51 and common bases 56. The odd pair have common collectors 52 and common bases 53. The common bases 53 of the odd pair are connected to the common collectors 51 of the even pair by metal connector 55. The common bases 56 of the even pair are connected to the common collectors 52 of the odd pair by metallic connector 58. The emitter 59 of the transistor 1 of the odd pair is connected to the emitter 60 of transistor 2 of the even pair by metal connector 61. Transistors 1 and 2, having the connected emitters, are the switching transistors. Transistors 3 and 4, having the non-connected emitters 62 and 63, respectively, are the control stransistors. The emitters of the control transistors 3 and 4 have metal connectors 64 and 65, respectively, connected to them. Contact with the circuit is made through metal connector 61 (for the control pulse) and metal connectors 64 and 65 (for the WRITE pulse).

One method of making connections to regions of the device is to use metal connectors which make contact with the body of semiconductor beneath only the portions of the connectors beyond the dotted line at the ends of the connectors shown on the plan view of FIG. 5. The remainder of the connectors are separated and insulated from the wafer of semiconductor by insulating layer 66. Where the semiconductor is silicon, this layer is preferably the oxide of the semiconductor material. Other conventional methods may alternatively be employed.

The regions themselves are generally formed in substrate 50 by diffusion, one above the other. The method is described in detail in U.S. Pat. No. 3,025,589, assigned to the same assignee as this invention. The method of forming the metal connectors above an oxide layer except where they are to contact the wafer is explained in U.S. Pat. No. 2,981,877, also assigned to the same assignee.

Although the drawings show the four transistors as being quite large, it must be remembered that in fact they are very tiny. The illustration shows only four transistors (one circuit); however, as many as 25 circuits (100 transistors) may in fact be formed on a single semiconductor wafer no larger than a twenty-five cent piece.

As will be apparent to one skilled in the art, many modifications may be made in the embodiments of the invention described above without departing from its spirit and scope. Therefore the only limitations to be placed on the scope of this invention are those expressed in the claims which follow.

What is claimed is:

1. A memory cell comprising a pair to transistors each having a first and second emitter, a base and a collector;

means for directly cross-coupling the collectors and the bases of said transistors;

means for applying a first signal simultaneously to said first emitters of each of said transistors; and means for applying a second signal selectively through the second emitter of one of said transistors during the time said first signal is present to place the corresponding transistor in a conducting state whereby data is stored in said cell corresponding to the actuated second emitter.

2. A memory cell comprising a pair of transistors each having a first and a second emitter, a base and a collector;

means for directly cross-coupling the collectors and the bases of said transistors;

means for setting the memory cell to one stable state;

readout means for indicating the state of said memory cell, and means for applying a readout signal simultaneously to said second emitter of each transistor so that the state of said memory cell is indicated selectively through one of said first emitters corresponding to the state of said cell to said readout means.

* * * * *